United States Patent [19]

Israel et al.

[11] Patent Number: 4,628,866
[45] Date of Patent: Dec. 16, 1986

[54] SIMULTANEOUS MATCHED FEEDING APPARATUS

[75] Inventors: Yedy Israel, Willowdale; Betsavel Oporto, Etobicoke; Alain Macdonald, Willowdale, all of Canada

[73] Assignee: Alcoholism & Drug Addiction Research Foundation, Toronto, Canada

[21] Appl. No.: 623,217

[22] Filed: Jun. 21, 1984

[51] Int. Cl.⁴ ............................................. A01K 7/06
[52] U.S. Cl. ..................................... 119/51.5; 119/75
[58] Field of Search ...................... 119/51 R, 51.5, 18, 119/72, 74, 75, 78, 52 R

[56] References Cited

FOREIGN PATENT DOCUMENTS 793516 2/1981 U.S.S.R. .............................. 119/51.5

Primary Examiner—Paul J. Hirsch
Attorney, Agent, or Firm—Cushman, Darby & Cushman

[57] ABSTRACT

The present invention relates to a simultaneous matched feeding apparatus. The apparatus includes two tube-like members containing liquids. The upper portions of the tubes are interconnected to allow air pressure in the upper portions of the tubes to equilibrate such that when one liquid is removed from one of the tubes, the other tube automatically dispenses a corresponding amount of another liquid.

9 Claims, 7 Drawing Figures $y = 0.6340x + 14.06$
$r = 0.689$

SIMULTANEOUS MATCHED FEEDING APPARATUS

FIELD OF THE INVENTION

The present invention relates to a simultaneous feeding apparatus. In particular, it relates to an apparatus for feeding animals foods in liquid form whereby the effects of the foods on the animals can be observed.

BACKGROUND OF THE INVENTION

The present state of the art in pair-feeding of animals for testing and experimental purposes involves a delayed feeding system using liquid diets delivered from Richter tubes. A Richter tube is an elongate tube having a series of graduations for measuring the amount of liquid in the tube. At the lower end of the Richter tube is a U-shaped delivery tube from which an animal may withdraw liquid food. An air pocket above the liquid normally retains the liquid in the elongate tube and U-shaped delivery tube.

While the Richter tube has been used in animal feeding experiments for several years, it does not guarantee simultaneous feeding of two or more animals used in an experiment. During animal feeding experiments, it is customary to feed one animal a liquid which may adversely effect the health of that animal and to feed another animal a control liquid having no known adverse health effects. For example, experiments conducted to determine the adverse effects of alcohol normally involve feeding one rodent a liquid including alcohol and a second rodent a control liquid, each liquid being equivalent in caloric value. The problem with these experiments, however, is that the animal may have a natural aversion to or preference for one of the two liquids. For example, rodents are known to have a natural aversion to alcohol. While liquid diets incorporating alcohol have been developed to overcome the rodents natural aversion to alcohol, the rodent will consume the alcohol liquid diet only to avoid starvation. On the other hand, the rodent consuming the control liquid will feed at a rate to satisfy its hunger. To ensure that the tested rodent and control rodent receive liquid of equivalent caloric value in a given time period, both rodents are supplied an amount of liquid equivalent to that which the rodent on the alcohol diet would be expected to consume during that same time period. As a result, the control animal tends to consume all of its liquid in the early stages of the time period while the experimental rodent consumes its liquid at a substantially steady rate over the entire time period. This is known as a delayed feeding system because the control animal receives an amount of diet equivalent to that consumed the previous day by the animal fed the alcohol containing diet. The result is that the nutritional and hormonal status of the control animal and the alcohol fed animal vary markedly at different times of the day. It is quite conceivable that some of the effects to alcohol consumption may actually result from differences in the nutritional patterns of the animals. The effects of nutritional patterns may be substantial since these experiments are usually performed over several weeks. Accordingly, the results of the testing and experimentation may not be conclusive. This problem is further enhanced when more then two animals are used in an experiment where there is one control liquid diet and several testing liquid diets containing various products to which the animals may have various degrees of preference.

OBJECTS OF THE PRESENT INVENTION

It is therefore an object of the present invention to provide an apparatus which permits simultaneous matched feeding of two or more animals.

It is another object of the present invention to provide a simultaneous matched feeding apparatus that is not subject to incidental feeding due to an animal.

It is another object of the present invention to provide a simultaneous matched feeding apparatus which is able to feed animals simultaneously for several days without requiring changes in the dietary solutions contained in the apparatus.

SUMMARY OF THE INVENTION

In accordance with one aspect of the present invention there is provided a simultaneous matched feeding apparatus for administering liquids to animals. The apparatus includes a first chamber adapted to normally retain a first liquid. The first chamber includes first liquid delivery means extending from a lower portion thereof to permit withdrawal of the first liquid from the first chamber. The apparatus includes at least one second chamber adapted to normally retain a second liquid. The second chamber includes second liquid delivery means extending from a lower portion for dispensing the second liquid and preventing incidental withdrawal of the second liquid from the second chamber. The first and second chambers have respective air spaces above the first and second liquids. The apparatus further includes air passage means connecting the air spaces of the first and second chambers to equilibrate air pressure in the air spaces whereby withdrawal of an amount of the first liquid from the first chamber causes a corresponding amount of the second liquid to be dispensed from the second chamber.

By providing air passage means connecting the upper portions of the two chambers, the pressure of the air spaces of the two chambers are maintained in equilibrium. This allows for the amount of first liquid withdrawn from the first chamber to correspond to an amount of second liquid being dispensed from the second chamber. If the densities of the liquids are the same and the chambers are of equal size, then an equal amount of second liquid will be dispensed for each amount of first liquid withdrawn from the first liquid delivery means.

The present invention provides a simultaneous matched feeding apparatus whereby the liquid consumed by animals during the experiment is fed to the animals at a rate equal to the rate at which the animal with the least preferred food would consume its liquid. In particular, with respect to experiments involving the consumption of alcohol, the simultaneous matched feeding maintains animals under the same feeding conditions such that nutritional and hormonal status of the control and chronically fed animals do not vary markedly at different times of day. Accordingly, it is now possible to conclusively determine whether any of the effects of the experiment are due to alcoholic consumption rather than resulting from the differences in nutritional patterns.

By "matched" feeding it is meant two or more animals consuming equivalent amounts of liquid diets while the term "simultaneous" refers to the time at which the liquid diets are consumed. In the event the animals are not of similar attributes, it would be possible to feed the animals the same type of liquid diet and provide the feature of simultaneous matched feeding by having the animal that consumes its food at the slowest rate receive its liquid from the first liquid delivery means of the first chamber.

The apparatus also prevents incidental feeding. By prevention of incidental feeding it is meant any feeding incidental to the experiment including that which an animal could consume from the second chamber without liquid being withdrawn from the first chamber. This ensures the apparatus simultaneously feeds the animals. In effect, the animal is isolated from the second chamber.

It should be understood that more than one second chamber may be connected to the first chamber by the air passage means.

The second food delivery means may include a spout through which the second food is discharged and a reservoir tube for receiving the second food. The reservoir tube is connected to the spout in an isolated manner that prevents incidental feeding. Preferably, the reservoir tube is provided with an aperture located adjacent the spout to prevent a negative pressure being induced via the tube in the second chamber. This prevents the animal from obtaining food from the second chamber when its counterpart has not eaten from the first chamber.

The first and second chambers may be at least partially surrounded by one or more cooling chambers to which fluid passes to maintain the temperature of the first and second liquids within a predetermined range of temperatures. By maintaining the temperature of the foods within a predetermined range of temperatures, the liquids are maintained in a stable condition for longer periods of time. In particular, it is common for control liquid to include a carbohydrate. However, the carbohydrate tends to ferment. Once the control liquid starts to ferment, it produces gas which enters the air space above the control liquid which results in the first and second liquids leaking from the chambers. Thus, the advantage of the cooling chambers is that they maintain the liquids used in the experiment at a sufficiently low temperature to keep the liquid in a stable condition for a longer period of time. As a result it is not necessary to replace the liquids as frequently. This allows the experiments to continue for longer periods of time without supervision. Other advantages of the apparatus are that the simultaneous feeding requires less technical help since it is not absolutely necessary to read diet levels and to calculate diet consumption on a daily basis as there is no need to adjust the diet consumption on the animal fed the control liquid to that of the alcohol fed animal.

In the preferred construction, the feeding chambers comprise vertically elongated tubes which, when filled with liquid, normally provide air spaces above the liquids. In the preferred construction, the first liquid is retained in the first chamber and a first delivery tube portion at the bottom of the first chamber. Typically, the type of tube envisaged for use as this part of the apparatus is similar in construction to the Richter tube.

The second chamber preferably comprise a vertically elongate tube having at its bottom portion a second delivery tube portion. This second delivery tube portion preferably includes a funnel portion having a spout from which the second liquid is dispensed. The second delivery portion may further include a reservoir tube positioned below the spout for receiving the second liquid. The reservoir tube is preferably connected to the delivery tube portion and has an aperture therein adjacent to or above the spout to prevent incidental withdrawal of the second liquid from the second chamber through the spout.

The air passage means preferably includes tubing which connects the upper portions of the first and second elongate tubes.

It should be understood that it is not necessary to have the first and the second elongate tubes of similar size. However, to make the amounts of second liquid dispensed the same as the first liquid withdrawn, it is preferred that the tubes be of equivalent diameter and the densities of the food be equivalent. In experiments where the diameters of the elongate tubes are the same and the liquids are of different densities, a different volume of liquid is dispensed for that withdrawn. However, since the weights of the liquids delivered are equivalent, matched feeding can be performed by equalizing the desired attributes of the diets by weight rather than by volume. In experiments where the densities of the liquids were the same but the volume of one tube was substantially larger than the other tube, then the larger tube would dispense a greater volume of liquid than the volume of liquid consumed from the smaller tube.

BRIEF DESCRIPTION OF THE DRAWINGS

For a better understanding of the nature and objects of the present invention, reference may be had by way of example to the accompanying diagrammatic drawings in which.

DETAILED DESCRIPTION OF THE DRAWINGS

Figure 1:
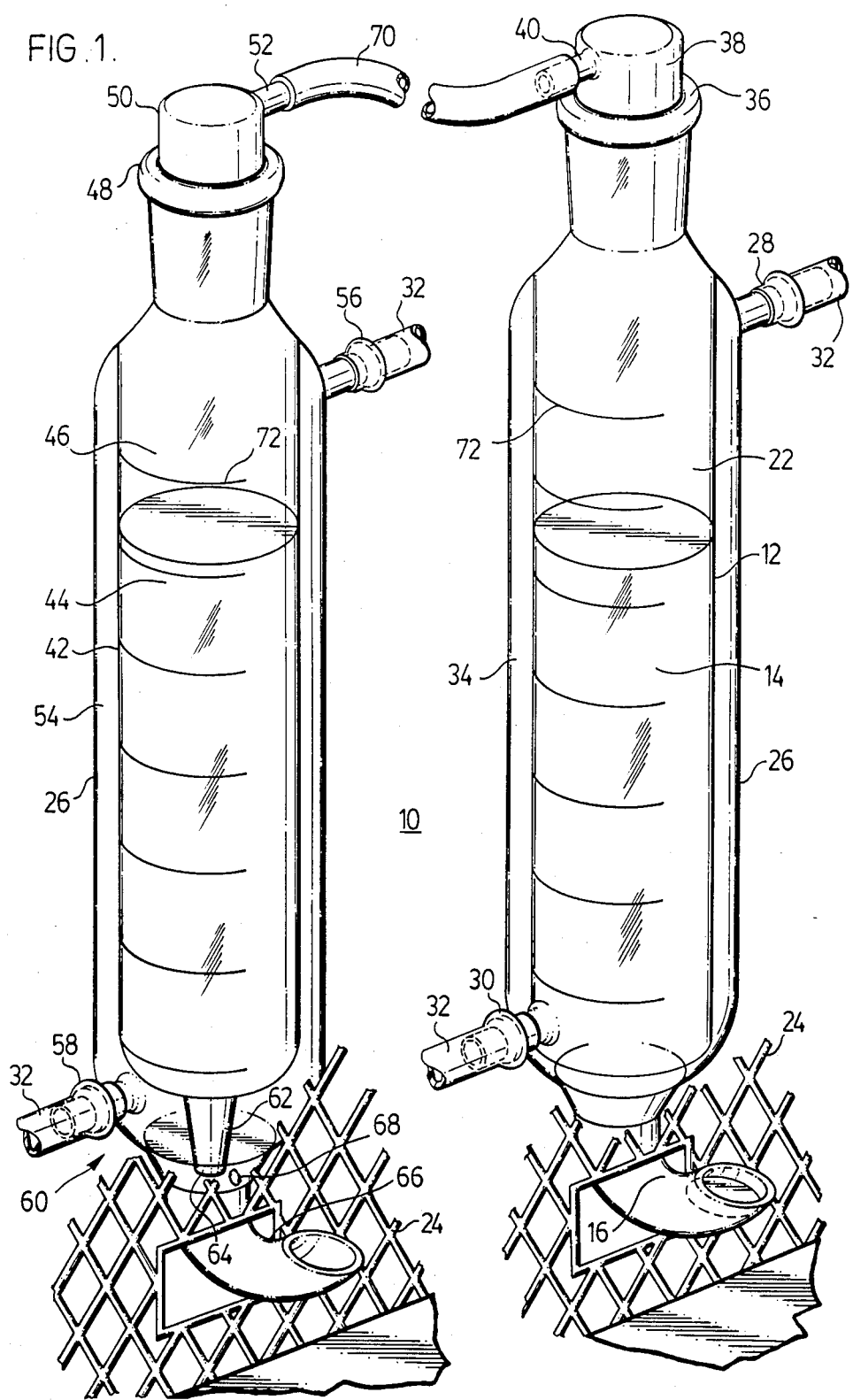
FIG. 1 is a perspective view of the simultaneous matched feeding apparatus of the present invention.
Figure 2:
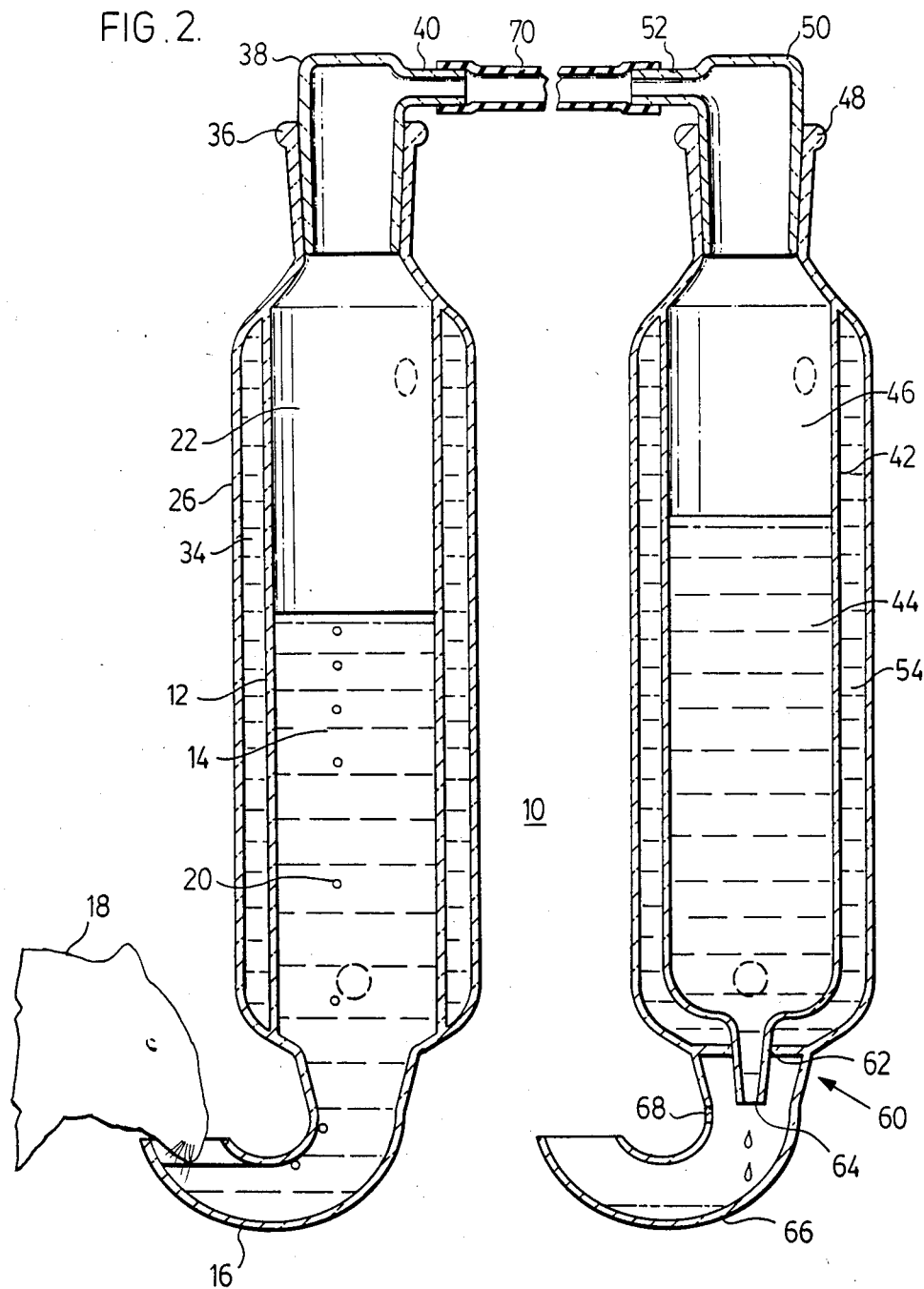
FIG. 2 is a side-sectional view illustrating simultaneous feeding by the apparatus of the present invention.

Referring to FIGS. 1 and 2, the simultaneous matched feeding apparatus of the present invention is shown at 10. The present invention was developed specifically for simultaneous matched feeding of alcohol and a control diet to two or more rodents. While the detailed description of the apparatus 10 will be in respect of alcohol and rodents, the apparatus may find application with other animals and other diets or liquids.

The apparatus 10 comprises a first vertically elongate tube 12 which contains a first liquid comprising an alcohol food diet 14. The alcohol diet is a non-preferred food to the rodent. The rodent drinks the diet to avoid starvation. The rodent obtains access to the food 14 at a first liquid delivery portion 16. The rodent is illustrated at 18 in FIG. 2.

The lower delivery portion 16 is substantially U-shaped in cross-section and as the rodent withdraws or consumes the food 14, air bubbles 20 rise through the diet 14 into the air space 22 above the diet 14. The food delivery portion 16 of the first tube 12 is shown extending through an opening in the grill 24 of the rodent's cage. The apparatus 10 may be connected to the grills of the rodents cages by any suitable means.

Surrounding the first elongate tube 12 is a first cooling tube 26. Cooling tube 26 is provided with an inlet port 28 and an outlet port 30. Ports 28 and 30 are connected to suitable tubing 32. Tubing 32 is normally connected to a cold water supply such that water is forced into inlet 28 through the spacing 34 between the first tube 12 and the cooling tube 26 and out through outlet port 30 of the cooling tube 26. The purpose of this refrigeration is to enhance the storage stability of the liquid. The connections of the inlet port and outlet port 28, 30, while shown to be provided with a bulb over which the tubing 32 passes, it should be understood that any other suitable connection may be used.

The tubes 12 and 26 are constructed from glass; however, any other material such as plastics, may be used. The lower spout portion 16 is sealingly engaged to the vertically elongate tube. It should be understood that this connection of the spout and elongate tube may comprise a screw-on type of connection or any other suitable connection as long as it is sealed with the tube 12. The upper portion of the tube 12 is provided with an inlet 36, normally closed by stopper 38. Stopper 38 may comprise a rubber stopper and in the preferred construction, comprises glass which is matingly received in inlet 36. Stopper 38 is provided with an air port 40.

The apparatus 10 further includes a second vertically elongate tube 42 in which a second liquid comprising the control diet 44 is contained. The control diet is the preferred food to the rodent. Above the control diet 44 is provided an air space 46. The second tube 42 is provided with an inlet port 48 which is sealed by closure 50. Closure 50 is provided with an air port 52. Surrounding the tube 42 is a second coolant tube 54. The second coolant tube 54 has an inlet port 56 and an outlet port 58. The purpose of coolant tube 54 is identical to that of the first coolant tube 26 in that it provides refrigeration for the control diet 44.

The second tube 42 is provided with a second liquid delivery means or portion 60. Delivery portion 60 includes a funnel 62 at the lower end of the tube 42 which terminates at spout 64. Below the spout 64 is a reservoir tube 66. Reservoir tube 66 is connected with the second cooling tube 54 and is provided with an aperture 68 slightly above the end of spout 64. The reservoir tube 66 also passes through a corresponding aperture in the grill 24 of the control rodent's cage.

Interconnecting the air spaces 22 and 46 of the first and second tubes 12, 42, is an air passage means including closures 38, 50 and tubing 70.

The operation of the simultaneous feeding apparatus 10 is now described.

The tubes 12 and 42 are filled with the liquid diets such that equivalent volumes of liquid diet are contained in the tubes. The tubes 12 and 42 are provided with graduations 72 which allow the quantity or volume of the diet in the tubes to be readily measured. Liquid is removed from the liquid delivery tube 16 of the first vertical elongate tube 12 until a first drop of diet passes through spout 64 into reservoir tube 66. Any diet present in reservoir 66 is then removed.

As the rodent 18 withdraws the alcohol diet 14 from the delivery tube 16, air bubbles 20 rise into air pocket 22. The reduction in weight of diet 14 and the presence of air bubbles 20 create a pressure change in air pockets 22 and 46. Because of the air passage means 70, pressure in the air spaces 22 and 46 equilibrates such that a corresponding amount of control liquid 44 passes through spout 64 into the reservoir receiving tube 66. As this control liquid is a preferred food, the rodent readily consumes the liquid diet dispensed from spout 64. This provides for simultaneous feeding.

It should be understood that the rodent normally consumes the preferred or control diet shortly after delivery, thus it does not accumulate or overflow from reservoir 66. Only in the instances where the rodent is not healthy or above a certain weight will its eating habits be different from the expected norm. In these instances the rodent is removed from the experiment.

The diameter of the tubes 12 and 42, illustrated in FIGS. 1 and 2, are the same. However, the diameters may be varied. This results in different volumes of control diet dropping from the spout 64 as the rodent removes the alcohol diet from the spout 16. Accordingly, the preferred construction in this experiment is that shown in FIG. 1.

The alcohol diet comprises 35% of its caloric content as ethanol. In the control diet, maltose-dextrin was used as the carbohydrate source to isocalorically replace ethanol in the control diet. It has been found that these diets, when properly prepared, can keep in the simultaneous feeding apparatus 10 without spoiling for about four days when the temperature of the diets is maintained in a range of temperatures between 4° to 7° C. The temperature of the diet may be maintained within this predetermined range of temperature by passing water through the spaces 54 and 34. Normal tap water in most environments will provide this range of temperature and pressure required. By maintaining the diet at these temperatures, fermentation of the control diet is avoided. Fermentation should be avoided since it will cause air bubbles to be generated into the air space 46 resulting in spillage. While not essential to the invention in any respect, it should be noted that preparation of the control diet at 50°-54° C. followed by rapid cooling for stable suspension for 5 to 6 days when the diet is maintained at a temperature of 4°-7° C.

Figure 3:
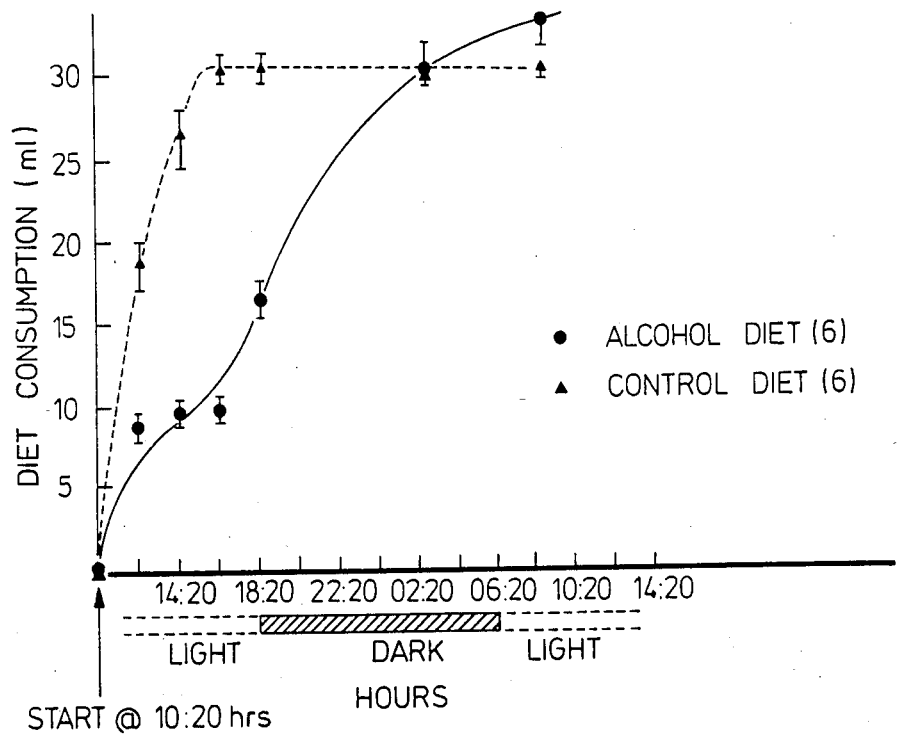
FIG. 3 is a graphic representation illustrating the consumption of an alcohol diet and a control diet using prior art feeding methods.
Figure 3A:
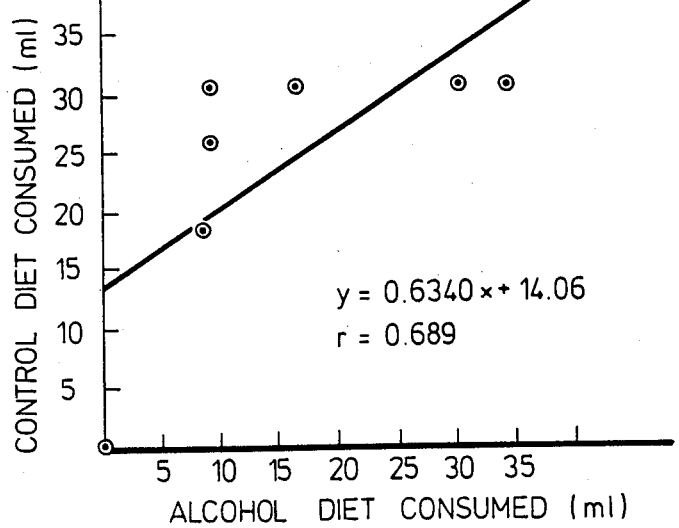
FIG. 3A is a plot of the correlation between the feedings in FIG. 3.
Figure 4:
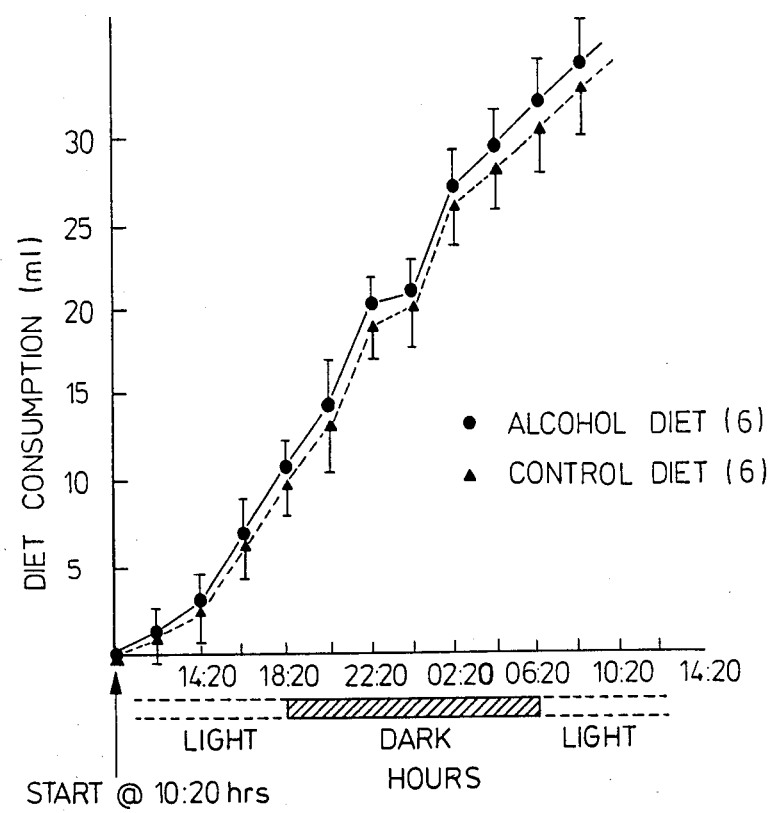
FIG. 4 is a graphic representation illustrating diet consumption over a given period of time using the apparatus of the present invention.

Referring now to FIGS. 3 and 4 there is shown two experiments over a period of approximately twenty-four hours. Each experiment was conducted on six rodents which consumed a control diet, and six rodents which consumed an alcohol diet. The plots in each instance measure time along the X coordinate and diet consumption in millilitres in the Y coordinate. Referring to FIG. 3 it is seen that the rodents consuming the alcohol diet consumed in a substantially steady rate. The control rodents consumed their food very quickly and had to starve for the remainder of the day once their food allotment was consumed. FIG. 3A indicates the correlation between the two lines of FIG. 3 to be about 69%. Clearly, the prior art method of delayed feeding involving two Richter tubes results in poor correlation in the eating patterns of the rodents.

Figure 4A:
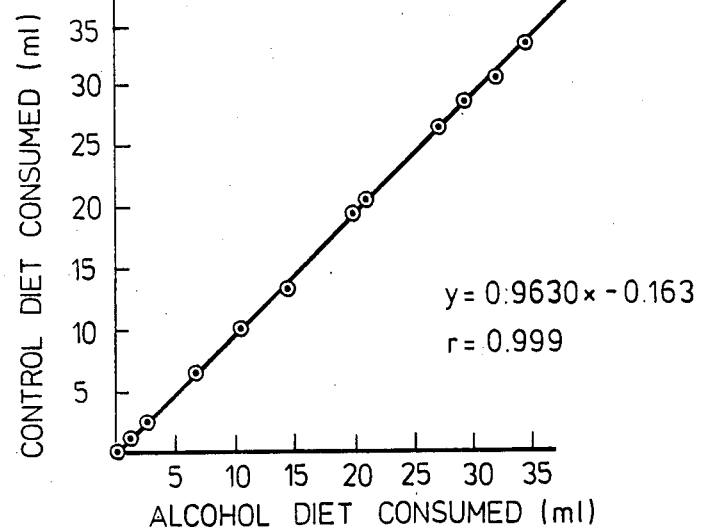
FIG. 4A is a plot of the correlation of the diets consumed during the experiment noted in FIG. 4.

Referring to FIG. 4 it is shown that the simultaneous feeding apparatus of the present invention has insured that the control animals feed only when the animals consuming alcohol feed. FIG. 4A shows that the correlation of these two feeding patterns is almost unity.

Clearly the simultaneous feeding apparatus of the present invention provides for almost perfect nutritional pairing of a control rodent and a rodent forced to consume an alcohol diet. This apparatus results in the activity cycles of the control fed rodent and the alcohol fed rodent being similar thereby eliminating this factor from the experiment.

Figure 5:
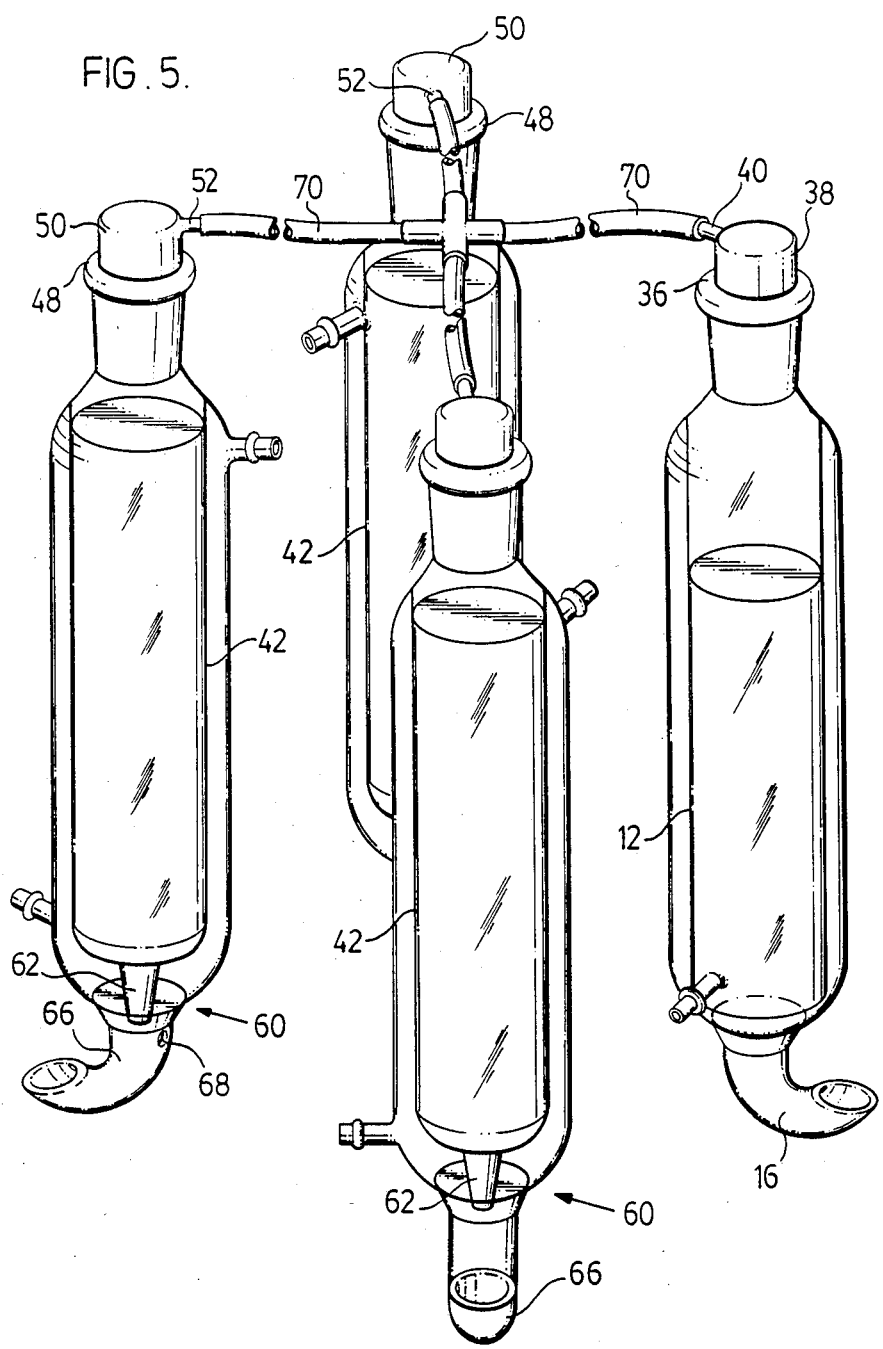
FIG. 5 is a perspective view showing the connection of several feeding apparatus in a simultaneous feeding apparatus of the present invention.

Referring now to FIG. 5 there is shown an apparatus 10 wherein three tubes indicated as 42, similar to tube 42 of FIG. 2, are shown connected to a first tube 12. Testing has indicated that as an animal drinks from tube 12, corresponding amounts of diet will be dispensed from the three secondary tubes 42. In the instance where the tubes 42 and 12 are all of the same diameter and the densities of the liquid diets are equivalent, equal amounts of liquid diet will dispense from tubes 42 when the same amount is consumed or withdrawn from tube 12.

What is claimed is:

1. A simultaneous matched feeding apparatus for administering different liquids to animals, said apparatus comprising:
 a first vertically elongate tube defining a first chamber for normally retaining a first liquid, said first elongate tube including a first liquid delivery tube portion extending from a lower end of the first elongate tube to permit withdrawal of the first liquid;
 at least one second vertically elongate tube defining a second chamber for normally retaining a second liquid, said second elongate tube including a second liquid delivery tube portion at its lower end comprising a funnel shaped portion having a spout from which the second liquid is dispensed, the second delivery tube portion having a reservoir tube positioned below said spout for receiving the second liquid, the reservoir tube being connected to the second food delivery tube portion and having an aperture therein adjacent or above the spout to prevent incidental withdrawal of the second liquid through the spout;
 the first and second elongate tubes when respectively filled with the first and second liquids normally having respective air spaces above the first and second liquids; and
 air passage tubing connecting the air spaces of the first and second elongate tubes whereby withdrawal of an amount of the first liquid from the first elongate tube changes the pressure of the air spaces causing a corresponding amount of liquid to be dispensed through the spout of the second elongate tube and into the reservoir tube.

2. The apparatus of claim 1 wherein the diameter of the first and second elongate tubes are equal such that the corresponding amount of the second liquid dispensed is equal in volume to the amount of first liquid withdrawn when the initial volumes and densities of the liquids are equal.

3. The apparatus of claim 1 further including first and second cooling tubes respectively surrounding a portion of the first and second elongate tubes, said cooling tubes each including an inlet port and an outlet port mutually spaced apart to permit fluid to flow through the cooling tube and over the respective elongate tube whereby the fluid maintains the temperature of the first and second liquids within a predetermined temperature range.

4. The apparatus of claim 3 wherein the cooling tube and its respective elongate tube are concentrically spaced apart.

5. The apparatus of claim 1 wherein upper portions of the first and second elongate tubes include a sealable port to facilitate filling of the tubes with liquid.

6. A feeding apparatus for use in a simultaneous matched feeding system for administering liquids to animals, said apparatus including:
 a chamber adapted to normally retain a liquid below an air space in said chamber, said chamber including liquid delivery means extending from a lower portion thereof for delivering the liquid from the chamber, and said chamber having an upper portion including air connection means throughwhich the air space of the chamber is connectible with other air spaces of the system for equilibrating air pressure in the air spaces, said liquid delivery means dispensing the liquid in response to a pressure change in the chamber so as to prevent incidental withdrawal of the liquid from the chamber, and said liquid delivery means including a funnel having a spout through which the liquid is discharged and a reservoir tube for receiving the liquid, said reservoir tube having an aperture located above or adjacent the spout to prevent a negative pressure being induced in the chamber via said reservoir tube.

7. The apparatus of claim 6 wherein the chamber is at least partially surrounded by a cooling chamber through which fluid passes to maintain the temperature of the liquid within a predetermined range of temperatures.

8. The apparatus of claim 7 wherein the chamber comprises a first vertically elongate tube and the cooling chamber includes a second vertically elongate tube concentrically spaced from and surrounding said first tube.

9. The apparatus of claim 6 wherein the upper portion of the chamber includes a sealable port to facilitate filling of the chamber with liquid.

* * * * *